Nov. 24, 1936.　　　F. F. JUNGKUNZ　　　2,061,944
ABREAST MOTORCYCLE CONTROL
Filed May 25, 1936
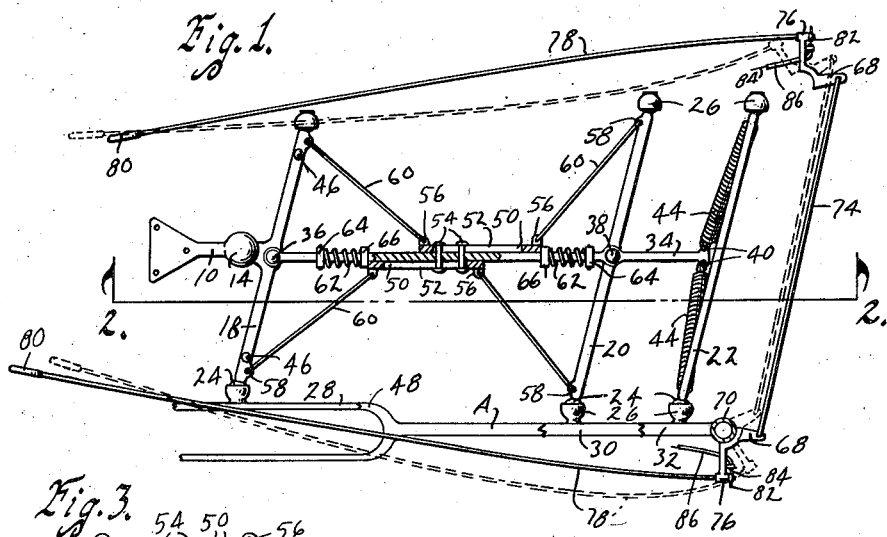
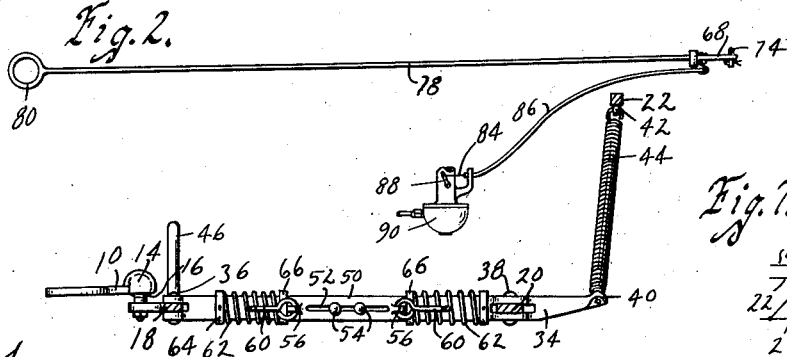
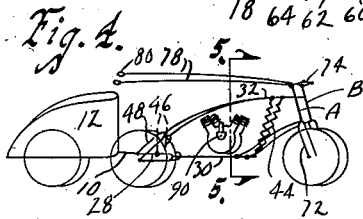
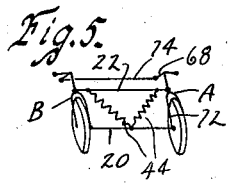
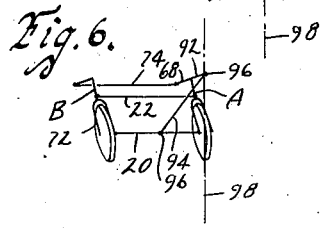
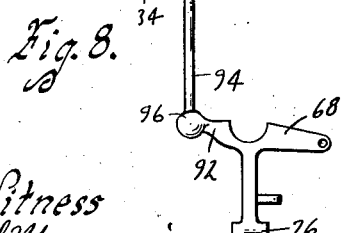
Inventor
Frank F. Jungkunz
By Bair, Freeman & Sinclair
Attorneys

UNITED STATES PATENT OFFICE 2,061,944

ABREAST MOTORCYCLE CONTROL

Frank F. Jungkunz, Milford, Iowa

Application May 25, 1936, Serial No. 81,700

13 Claims. (Cl. 180—1)

An object of my invention is to provide an abreast motorcycle control of simple, durable and inexpensive construction.

A further object is to provide means for controlling two or more motorcycles from a position rearward of the motorcycles, such for instance as by an operator positioned in a chariot or other vehicle drawn by the motorcycles, the device being particularly adaptable for amusement parks, fairs and the like.

A further object is to connect two or more motorcycles in abreast relationship so that they can be simultaneously steered by means of reins or the like extending to a chariot drawn by the motorcycles, and can be individually controlled as to speed by the reins, which preferably control the carburetors or other speed controllers of the motorcycles in accordance with different positions to which the reins are twisted.

Still a further object is to provide a connected frame work between the motorcycles which permits them to tilt, and thereby assume a banked position for rounding a curve.

Another object is to provide a modified construction in which means is provided for positively producing a tilting movement by the flexible reins upon their being adjusted to a position for steering the motorcycles around the curve.

A further object is to provide the frame work of such construction that one motorcycle can advance ahead of the other to a limited extent, resilient means being provided to constrain the motorcycles against such advance, whereby to provide a smoothly operating abreast relationship control for the motorcycles.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a plan view of my abreast motorcycle construction showing only a portion of one of the motorcycles to illustrate the connection of the control thereto, parts at the central portion of the figure being broken away and other parts shown in section to illustrate the construction, and the frame work being in a position which it will assume when one motorcycle advances ahead of the other with the motorcycles following a straight course.

Figure 2 is a sectional view on the line 2—2 of Figure 1 and shows a speed control connection with the carburetor of one of the motorcycles.

Figure 3 is a plan view of the central portion of Figure 1 showing the parts in normal position.

Figure 4 is a diagrammatical view in side elevation showing my control in use for connecting a chariot to a plurality of motorcycles.

Figure 5 is a diagrammatical view as taken on the line 5—5 of Figure 4, showing the motorcycles in a banked position for rounding a curve.

Figure 6 is a similar diagrammatical view showing a modified construction in which means is provided for positively tilting the motorcycles.

Figure 7 is a view similar to a portion of Figure 6 showing the motorcycles tilted to the opposite position for rounding a right hand instead of a left hand curve; and Figure 8 is a plan view showing the parts required for the modification illustrated in Figures 6 and 7.

On the accompanying drawing I have used the reference numeral 10 to indicate a draw bar for a chariot 12 or other vehicle, which is illustrated diagrammatically in Figure 4. The draw bar 10 is provided with a socket 14 at its forward end which receives a ball 16 of a cross bar 18. The cross bar 18 and other cross bars 20 and 22 are provided for the purpose of affording a connection between a pair of motorcycles indicated generally at A and B.

Although in my specification I will describe the frame work for but two motorcycles, it is obvious that additional frame work can be provided for three or more motorcycles if desired.

Each cross bar 18, 20, and 22 is provided on its ends with balls 24 received in sockets 26. The sockets 26 for the bars 18, 20, and 22 are welded or otherwise suitably secured to the lower rear fork 28, the lower frame bar 30 and upper frame bar 32 respectively of the motorcycles A and B. Due to the ball and socket arrangement, one motorcycle can advance ahead of the other, thus positioning the bars 18, 20, and 22 angularly as illustrated in Figure 1, and also as illustrated in Figure 5 the motorcycles may tilt sidewise.

My frame work further includes a longitudinal bar 34 pivoted at 36 to the cross bar 18 and at 38 to the cross bar 20. The bar 34 extends forwardly beyond the pivot 38 and terminates in a pair of ears 40. The cross bar 22 is provided with a pair of ears 42 and a pair of springs 44 connect the ears 40 with the ears 42. The purpose of the springs 44 is to tend to retain the motorcycles in an upright or non-tilted position as the springs, of course, tend to balance each other.

When in the tilted position of Figure 5, one spring is stretched and the other contracted, and therefore the springs tend to move the frame work back to a position where the motorcycles are upright. These springs are provided merely for the purpose of keeping the motorcycles upright when at rest, and may be eliminated if this is not required.

The cross bar 18 is preferably provided with upwardly extending arms 46 adapted for the rear upper fork 48 of the motorcycle to engage to limit the tilting of the motorcycles. It is also desirable to limit the advance of one motorcycle ahead of the other, and this may be accomplished by providing a pair of elements 50 slidable relative to the bar 34.

In Figure 1 I illustrate the elements 50 as having slots 52 receiving bolts or rivets 54 extending through the bar 34. The elements 50 are provided with ears 56 which are connected with ears 58 of the cross bars 18 and 20 by rods or links 60. Thus when the cross bars 18 and 20 swing to a position other than right angles to the bar 34, one element 50 moves forwardly and the other rearwardly.

It is desirable, however, to have the motorcycles remain evenly abreast, and for this purpose I provide springs 62 on the rod 34 confined between stationary collars 64 and movable collars 66. The movable collars are moved in opposite directions, one by each of the elements 50, as illustrated in Figure 1, thus compressing the springs 62. The springs therefore tend to return the elements 50 to registered position with the cross bars 18 and 20 at right angles to the bar 34.

Thus when one motorcycle advances ahead of the other, its load is increased as it tends, through the compression of springs 62, to pull the other motorcycle. This provides a much smoother operation of the motorcycles in abreast position than can be secured without the use of such mechanism as just described.

When driving the motorcycles abreast or hitched to a chariot or the like, it is, of course, desirable to control both the steering and the speed of the motorcycles from the chariot.

I have accomplished this by securing bell crank levers 68 by welding or the like to the shanks 70 of the front forks 72 of the motorcycles A and B. These are connected by a rod or link 74, whereby the motorcycles are simultaneously steered. The levers 68 are provided with hubs 76 through which flexible reins or the like 78 rotatably extend. These reins may be made of a series of telescoping springs wound in opposite directions, as used in "flexible shafts" of machinery, or may be made of rods jointed together with universal joints or in any other fashion permitting flexibility so that the motorcycles can be steered as illustrated by dotted lines in Figure 1, and yet when the reins 78 are twisted at their rear ends, they will likewise twist at their forward ends. The rearward ends are provided with looped members 80 or any suitable type of handle or grip which will rotate the reins when the handles themselves are rotated.

The forward ends of the reins are provided with levers 82, which are operatively connected as by flexible wires 84 extending through flexible conduits 86 to the butterfly levers 88 of the carburetors 90 of the motorcycles A and B, or to any other speed controller provided in the motorcycle.

Motorcycles when steered to the right or left automatically bank for turning a curve. This is illustrated in Figure 5 where the motorcycles have been turned toward the left, and consequently lean toward the left. The springs 44 tend to bring them back to an upright position, although the springs can be eliminated and thus such tendency eliminated, whereas the inherent tendency of the motorcycle is to remain in upright position except when steered to the right or left.

Means may be provided however for positively banking the motorcycles by the addition of a lever 92 on one of the bell crank levers 68 and a link connection 94 between this lever and the frame bar 34. Suitable ball and socket joints are illustrated at 96 to connect the ends of the link 94 with the lever 92 and the frame bar 34. As illustrated in Figure 6, when the motorcycles are steered to the left, the upper ball and socket joint 96 will tend to remain on the vertical center line 98, thus forcing the upper cross bar 22 toward the left, the reverse occurring in Figure 7 when steering to the right. This provides a positive tilting means for the motorcycles which tilts them in proportion to their turning movement.

By using my abreast motorcycle control as disclosed, it is possible to control two or more motorcycles from a chariot or the like drawn by them, much in the manner that horses are controlled, since the control is accomplished through a pair of reins. This provides a spectacular display when several outfits are engaged in a race.

Extension clutch controls may be provided for the clutches of the motorcycles, so that when the motorcycles are running, the outfit can be started and stopped as desired, but since there is no unusual construction necessary for this control, I have not illustrated it. The control I do illustrate, however, permits the necessary simultaneous steering and banking of the motorcycles and permits individual control of the speed of each motorcycle in accordance with conditions encountered.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In an abreast motorcycle control, a plurality of motorcycles, a frame work connecting said motorcycles in spaced apart abreast relationship and permitting limited advance of one motorcycle ahead of the other, resilient means tending to prevent such advance, a lever attached to a steerable part of each motorcycle, said levers being interconnected for simultaneous movement, means for actuating said levers from a position rearward of said motorcycles and a speed controller for said motorcycles actuated from said means.

2. In an abreast motorcycle control, a plurality of motorcycles, a frame work connecting said motorcycles in spaced apart abreast relationship and permitting limited advance of one motorcycle ahead of the other, a lever attached to a steerable part of each motorcycle, said levers being interconnected for simultaneous movement, means for actuating said levers from a position rearward of said motorcycles and a speed controller for said motorcycles actuated from said means.

3. In an abreast motorcycle control, a plurality of motorcycles, a frame work connecting said motorcycles in spaced apart abreast relationship, a lever attached to a steerable part of each motorcycle, said levers being interconnected for simultaneous movement, means for actuating said levers from a position rearward of said motorcycles and a speed controller for said motorcycles actuated from said means.

4. In an abreast motorcycle control, a plurality of motorcycles, a frame work connecting said motorcycles in spaced apart abreast relationship and permitting limited advance of one motorcycle ahead of the other, resilient means tending to prevent such advance, a lever attached to a steerable part of each motorcycle, said levers being interconnected for simultaneous movement, means for actuating said levers from a position rearward of said motorcycles and a speed controller for said motorcycles actuated from said means, said frame work permitting tilting of said motorcycles to permit them to bank for rounding a curve.

5. In an abreast motorcycle control, a plurality of motorcycles, a frame work connecting said motorcycles in spaced apart abreast relationship and permitting limited advance of one motorcycle ahead of the other, resilient means tending to prevent such advance, a lever attached to a steerable part of each motorcycle, said levers being interconnected for simultaneous movement, means for actuating said levers from a position rearward of said motorcycles, a speed controller for said motorcycles actuated from said means, said frame work permitting tilting of said motorcycles to permit them to bank for rounding a curve and means interconnecting said levers and frame work to cause such tilting.

6. In an abreast motorcycle control, a plurality of motorcycles, a frame work connecting said motorcycles in spaced apart abreast relationship, a lever attached to a steerable part of each motorcycle, said levers being interconnected for simultaneous movement, means for actuating said levers from a position rearward of said motorcycles and a speed controller for said motorcycles actuated from said means, said frame work permitting tilting of said motorcycles to permit them to bank for rounding a curve.

7. In an abreast motorcycle control, a plurality of motorcycles, a frame work connecting said motorcycles in spaced apart abreast relationship, a lever attached to a steerable part of each motorcycle, said levers being interconnected for simultaneous movement, means for actuating said levers from a position rearward of said motorcycles, a speed controller for said motorcycles actuated from said means, said frame work permitting tilting of said motorcycles to permit them to bank for rounding a curve and means interconnecting said levers and frame work to cause such tilting.

8. In an abreast motorcycle control, a plurality of motorcycles, a frame work connecting said motorcycles in spaced apart abreast relationship, a lever attached to a steerable part of each motorcycle, said levers being interconnected for simultaneous movement, means for actuating said levers from a position rearward of said motorcycles, a speed controller for said motorcycles actuated from said means, said frame work permitting tilting of said motorcycles to permit them to bank for rounding a curve and resilient means tending to retain said motorcycles in nontilting position.

9. In an abreast motorcycle control, a plurality of motorcycles, a frame work connecting said motorcycles in spaced apart abreast relationship, a lever attached to a steerable part of each motorcycle, said levers being interconnected for simultaneous movement, means for actuating said levers from a position rearward of said motorcycles, said means comprising flexible reins and speed controllers for said motorcycles operatively connected with said reins to be actuated by twisting thereof.

10. In an abreast motorcycle control, a plurality of motorcycles, a frame work connecting said motorcycles in spaced apart abreast relationship, a pair of slidable elements on said frame work and connected with said frame to slide in opposite directions upon one motorcycle advancing ahead of another, resilient means constraining said elements against sliding relative to each other, said frame work permitting tilting of said motorcycles to permit them to bank for rounding a curve and connections with steerable parts of said motorcycles to impart simultaneous steering movement to each thereof.

11. In an abreast motorcycle control, a plurality of motorcycles, a frame work connecting said motorcycles in spaced apart abreast relationship, a pair of slidable elements on said frame work and connected with said frame to slide in opposite directions upon one motorcycle advancing ahead of another, resilient means constraining said elements against sliding relative to each other, said frame work permitting tilting of said motorcycles to permit them to bank for rounding a curve and connections with steerable parts of said motorcycles to impart simultaneous steering movement to each thereof and with said frame work to cause such tilting.

12. In an abreast motorcycle control, a plurality of motorcycles, a frame work connecting said motorcycles in spaced apart abreast relationship, a pair of slidable elements on said frame work and connected with said frame to slide in opposite directions upon one motorcycle advancing ahead of another, resilient means constraining said elements against sliding relative to each other, said frame work permitting tilting of said motorcycles to permit them to bank for rounding a curve, connections with steerable parts of said motorcycles to impart simultaneous steering movement to each thereof and with speed controllers of said motorcycles to individually adjust said speed controllers from said connections.

13. In an abreast motorcycle control, a plurality of motorcycles, a frame work connecting said motorcycles in spaced apart abreast relationship, a pair of slidable elements on said frame work and connected with said frame to slide in opposite directions upon one motorcycle advancing ahead of another, resilient means constraining said elements against sliding relative to each other, said frame work permitting tilting of said motorcycles to permit them to bank for rounding a curve, connections with steerable parts of said motorcycles to impart simultaneous steering movement to each thereof and with speed controllers of said motorcycles to individually adjust said speed controllers from said connections, said connections comprising flexible reins which upon being twisted adjust said speed controllers.

FRANK F. JUNGKUNZ.